United States Patent
Brierley et al.

(10) Patent No.: US 6,682,573 B2
(45) Date of Patent: Jan. 27, 2004

(54) AZO DISPERSE DYE MIXTURES

(75) Inventors: David Brierley, Lancs (GB); Ian Weddell, Northwich (GB); David Newton, High Crompton (GB)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 21 days.

(21) Appl. No.: 09/951,057

(22) Filed: Sep. 13, 2001

(65) Prior Publication Data

US 2002/0040510 A1 Apr. 11, 2002

(30) Foreign Application Priority Data

Sep. 15, 2000 (GB) ................................................ 0022697

(51) Int. Cl.$^7$ .............................. C09B 67/22; C09P 3/36
(52) U.S. Cl. .................................... 8/639; 8/638; 8/922
(58) Field of Search ............................. 8/638, 639, 922

(56) References Cited

U.S. PATENT DOCUMENTS

| | | | |
|---|---|---|---|
| 3,122,410 A | | 2/1964 | Mueller et al. |
| 4,389,216 A | * | 6/1983 | Bergmann et al. |
| 4,405,330 A | * | 9/1983 | Bergmann et al. |
| 5,201,922 A | * | 4/1993 | Seto et al. |
| 5,393,308 A | * | 2/1995 | Lange et al. |
| 5,431,699 A | | 7/1995 | Lange et al. ............... 8/639 |
| 5,494,492 A | * | 2/1996 | Himeno et al. |
| 5,505,742 A | * | 4/1996 | Himeno et al. |
| 5,942,604 A | | 8/1999 | Herzig et al. ............... 534/581 |
| 6,121,352 A | * | 9/2000 | Hoppe et al. |

FOREIGN PATENT DOCUMENTS

| | | |
|---|---|---|
| BE | 592096 | 7/1960 |
| CA | 2266189 * | 9/1999 |
| CH | 406 481 | 1/1966 |
| DE | 43 04 744 | 8/1994 |
| EP | 379 872 | 8/1990 |
| EP | 491 386 | 6/1992 |
| EP | 661 352 | 7/1995 |
| EP | 802 239 | 10/1997 |
| EP | 864 615 | 9/1998 |
| EP | 939 108 | 9/1999 |
| GB | 2 336 852 | 11/1999 |
| JP | 1314790 | 12/1989 |

OTHER PUBLICATIONS

K. Himeno et al., "Exhaust Dyeing of Polyester Fibers with Dispers Dyes in Alkaline Baths Containing Amino Acids," *Chemical Abstracts*, vol. 112, No. 25: p. 77 (1990) (XP002036536).

S.R. Shuka and S.S. Dhuri, "Assesing the Compatibility of Disperse Dye Mixtures by the Use of Colour Coordinates," *Journal of The Society of Dyers and Colourists*, vol. 108, No. 3: pp. 139–144 (1992) (XP000259896).

* cited by examiner

*Primary Examiner*—Margaret Einsmann
(74) *Attorney, Agent, or Firm*—Connolly Bove Lodge & Hutz LLP

(57) ABSTRACT

The present invention refers to a dye mixture comprising an azo dye of the formula (I)

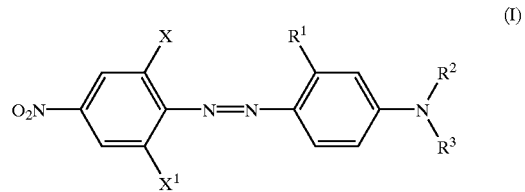

wherein
  each of X and $X^1$ independently is chlorine or bromine;
  $R^1$ is absent or is $C_{1-4}$ alkyl; and
  each of $R^2$ and $R^3$ independently is hydrogen, $C_{1-6}$ alkyl or cyanoethyl;
  but when $R^1$ is absent, $R^2$ is n-butyl or cyanoethyl and $R^3$ is cyanoethyl;
  and further dye components according to claim 1,
a method for the preparation of such mixtures and a method for coloring a synthetic textile material or fiber blend thereof using such mixtures.

11 Claims, No Drawings

AZO DISPERSE DYE MIXTURES

This invention relates to mixtures of disperse azo dyes.
A known azo dye is C.I. Disperse Orange 37 of the formula

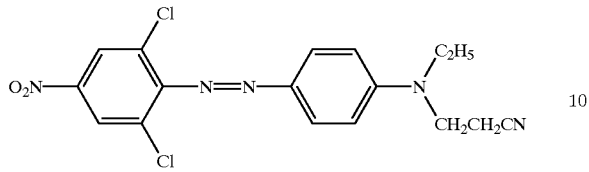

This dye is disclosed, for example, in CH-A-0406481. Commercially, the dye has been mixed with other dyes to give different shades. However, this dye has been found to act as a skin irritant.

Mixtures of azo dyes are also disclosed in DE-A-4304744 and BE-A-0592096.

DE-A-4304744 discloses dye mixtures containing
(a) 10 to 90 wt % of one or more azo dyes of the formula

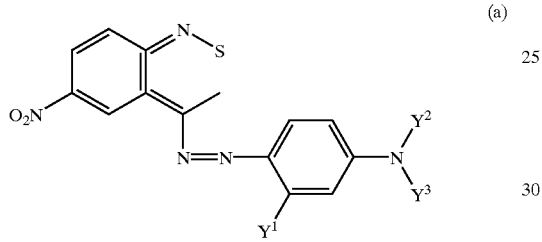

wherein $Y^1$ is absent or is $C_{1-6}$ alkyl, $C_{1-6}$ alkoxy or optionally substituted $C_{1-8}$ alkylamino or $C_{3-4}$ alkenylamino and each of $Y^2$ and $Y^3$ independently is hydrogen or optionally substituted $C_{1-6}$ alkyl;

(b) 10 to 90 wt % of ($b^1$) an azo dye component of the formula

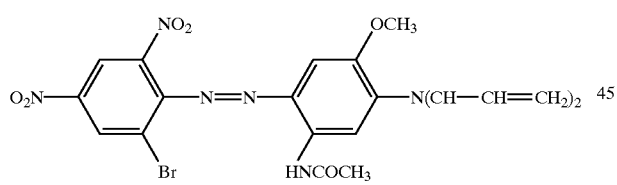

and optionally ($b^2$) an azo dye component of the formula

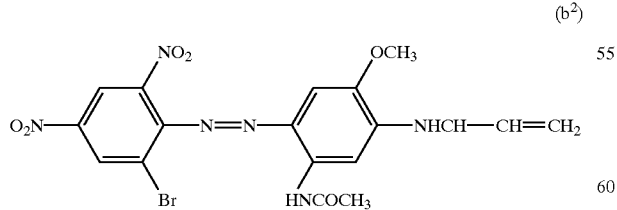

in which dye component ($b^1$) is present in an amount of 50 to 100 wt %, and dye component ($b^2$) is present in an amount of 0 to 50 wt %, of component (b); and (c) 0 to 70 wt % of one or more azo dyes of the formula ($c^1$) or ($c^2$)

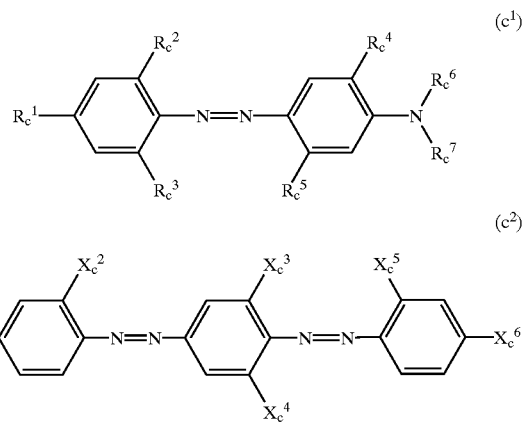

in which $R_c^1$ is a nitro or $C_{1-6}$ alkylsulphonyl group optionally substituted by hydroxy;

each of $R_c^2$ and $R_c^3$ independently is absent or is chlorine or bromine;

each of $R_c^4$ and $R_c^5$ independently is absent or is chlorine;

each of $R_c^6$ and $R_c^7$ independently is hydrogen or is an optionally substituted $C_{1-4}$ alkyl or phenyl group or when $R_c^2$ and $R_c^3$ are absent or are chlorine, $R_c^6$ and $R_c^7$ may additionally be cyanoethyl.

BE-A-0592096 discloses dyes of the formula

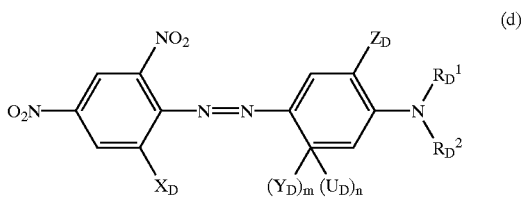

wherein $X_D$ is hydrogen* or is chlorine, bromine, cyano, trifluoromethyl or nitro.

$Y_D$ is hydrogen*, chlorine, bromine or low molecular weight alkyl;

$U_D$ exemplified as hydrogen* or methyl (no other definition given);

$Z_D$ is hydrogen* or low molecular weight alkyl;

$R_D^1$ is low molecular weight alkyl, alkoxyalkyl or acyloxyalkyl;

$m_D$ is zero or 1;

$n_D$ is zero or 1; and the value of $R_D^2$ is such that when $n_D$ is zero and $m_D$ is 1, $R_D^2$ is acyloxyalkyl while when $m_D$ is zero and $n_D$ is 1, $R_D^2$ is cyanoethyl.

BE-A-0592096 also discloses mixtures of dyes of the above formula (d) in which, specifically $n_D$ is zero, $m_D$ is 1, $Y_D$ is NHCOCH$_3$ and $R_D^2$ is acyloxyalkyl with dyes of the formula (e)

(e)

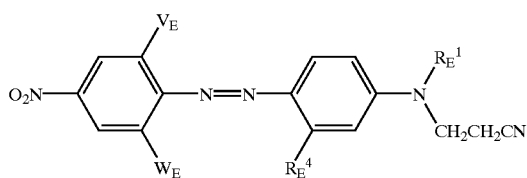

wherein
$V_E$ is hydrogen*, chlorine or bromine;
$W_E$ is chlorine, bromine, cyano or trifluoromethyl;
$R_E^4$ is hydrogen*, methyl, ethyl or chlorine; and
$R_E^1$ is low molecular weight alkyl, alkyloxyalkyl or acyloxyalkyl.

* Although BE-A-0592096 refers to "hydrogen" as being a possible substituent for each of $U_D$, $X_D$, $Y_D$, $Z_D$, $V_E$ and $R_E^4$, it seems clear that this is intended merely to indicate the absence of such a substituent.

It is pointed out that there is no disclosure, in BE-A-0592096, of dyes of the formula (e) wherein each of $V_E$ and $W_E$ is a chlorine or bromine atom and $R_E^1$ is a low molecular weight alkyl group.

Surprisingly, we have found a range of dye mixtures in which the components do not cause any noticeable skin irritation and which provide at least one of excellent heat fastness, high colour strength and excellent build-up characteristics.

Thus, the present invention provides a dye mixture comprising at least
(1)
  (A) at least one azo dye of the formula (I)

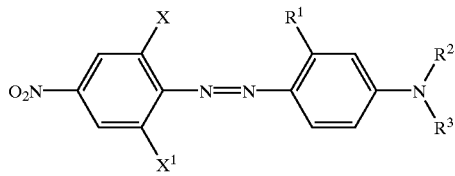

(I)

wherein
each of X and $X^1$ independently is chlorine or bromine;
$R^1$ is absent or is $C_{1-4}$ alkyl; and
each of $R^2$ and $R^3$ independently is hydrogen, $C_{1-6}$ alkyl or cyanoethyl; but
when $R^1$ is absent, $R^2$ is n-butyl or cyanoethyl and $R^3$ is cyanoethyl; and
  (B) at least one azo dye of the formula (II)

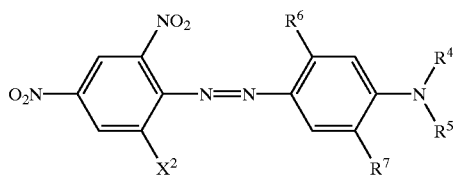

(II)

wherein
$X^2$ is absent or is chlorine or bromine;
each of $R^4$ and $R^5$ independently is hydrogen, $C_{1-4}$ alkyl, allyl or cyloxyalkyl;
$R^6$ is $C_{1-4}$ alkyl or NHCOY, in which Y is hydrogen, $C_{1-4}$ alkyl, or $NH_2$; and
$R^7$ is $C_{1-4}$ alkoxy; and at least when, in the formula (I), $R^1$ is absent and, in the formula (II), $X^2$ is bromine, $R^6$ is NHCOY (in which Y is methyl), $R^7$ is methoxy and each of $R^4$ and $R^5$ is allyl or one of $R^4$ and $R^5$ is allyl and the other is hydrogen
  (C) at least one azo dye of the formula (III)

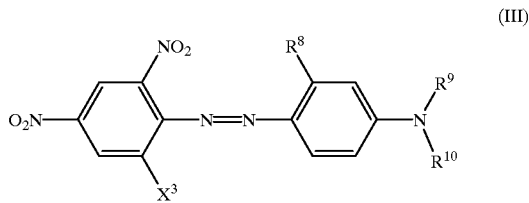

(III)

wherein
$X^3$ is absent or is chlorine or bromine;
$R^8$ is $C_{1-4}$ alkyl or NHCOY, in which Y is hydrogen, $C_{1-4}$ alkyl or $NH_2$; and
each of $R^9$ and $R^{10}$ independently is hydrogen, $C_{1-4}$ alkyl, allyl or acyloxyalkyl; or
(2)
  (A) at least one azo dye of the formula (I), given and defined above, wherein $R^1$ is absent, $R^2$ is n-butyl or cyanoethyl and $R^3$ is cyanoethyl; and
  (D) at least one azo dye of the formula (IV)

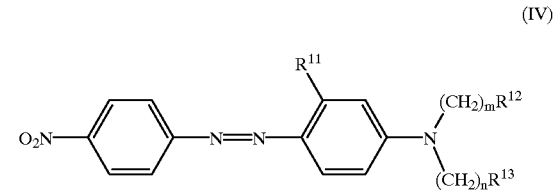

(IV)

wherein
$R^{11}$ is absent or is $C_{1-4}$ alkyl;
$R^{12}$ is hydrogen, cyano, hydroxyl, $OCOR^{14}$ or $OCOOR^{14}$ in which $R^{14}$ is $C_{1-4}$ alkyl, aryl or aralkyl;
$R^{13}$ is hydroxyl, $OCOR^{14}$ in which $R^{14}$ is as defined above; and each of m and n independently is 1, 2, 3 or 4.

Alkyl groups may be straight-chained or branched and be for example methyl, ethyl, n-propyl, i-propyl, n-butyl, i-butyl, sec. butyl or tert.-butyl. This applies as well to alkyl groups in acyloxyalkyl, alkoxy and aralkyl residues. Acyl in acyloxyalkyl is preferably COY wherein Y is $C_{1-4}$ alkyl. Aryl is preferably phenyl and naphthyl. Aralkyl is preferably benzyl and phenethyl.

In one preferred range of dye mixtures embodying the invention, the dye of the formula (I) has the formula

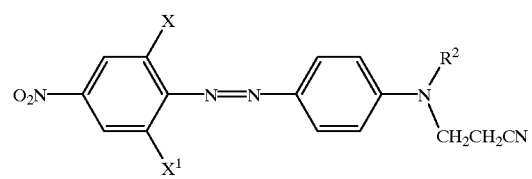

$(I)^1$ in which each of X and $X^1$ independently is chlorine or bromine and $R^2$ is n-butyl or cyanoethyl, and the mixture additionally contains a dye of the formula (II), given and defined above and optionally a dye of the formula (III), also given and defined above.

In such a dye mixture, an especially preferred dye of the formula (I)$^1$ has the formula (1)

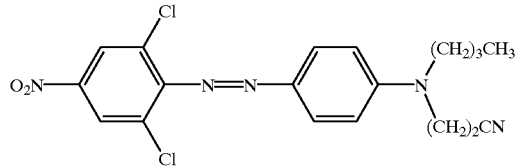

(1)

Such a dye does not cause irritation to the skin and lends to the mixture excellent heat fastness.

Especially when the mixture contains a dye of the formula (I)$^1$, given and defined above, a preferred dye of the formula (II) in the mixture has the formula (II)$^1$

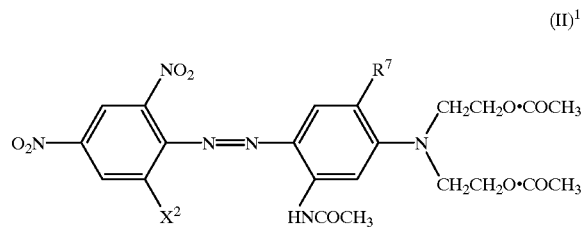

(II)$^1$ in which $X^2$ is chlorine or bromine and $R^7$ is methoxy or ethoxy.

It is not necessary to include, in a mixture containing the dyes of the formulae (I)$^1$ and (II)$^1$, a dye of the formula (III) but such a dye may be added when a different shade is required.

A dye mixture of dye components of the respective formulae (I)$^1$ and (II)$^1$ preferably contains from 15–75% inclusive of the dye of the formula (I)$^1$ and from 25–85% inclusive of the dye of the formula (II)$^1$, more preferably from 30–60% inclusive of the dye of the formula (I)$^1$ and from 40–70% inclusive of the dye of the formula (II)$^1$, by weight of the weight of the mixture of dyes of the formulae (I)$^1$ and (II)$^1$.

On the other hand, when, in a dye mixture containing dye components of the formula (II)$^1$ a dye of the formula (III) is additionally present, this dye component preferably has the formula (III)$^1$

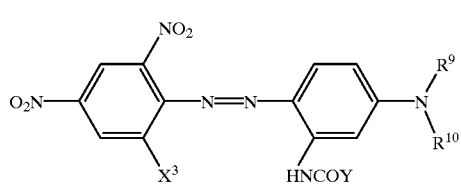

(III)$^1$ in which $X^3$ is chlorine or bromine, Y is methyl or ethyl and each of $R^9$ and $R^{10}$ independently is ethyl or allyl.

In such a dye mixture, the dye of the formula (II) is preferably a dye (II)$^2$ in which $X^2$ is chlorine, each of $R^4$ and $R^5$ independently is ethyl, allyl or acetoxyethyl, $R^6$ is the group NHCOY (in which Y is methyl or ethyl) and $R^7$ is $C_{1-6}$ alkoxy.

In an especially preferred dye mixture embodying the invention in the formula (I)$^1$, $R^1$ is absent, $R^2$ is n-butyl, $R^3$ is cyanoethyl and each of X and $X^1$ is chlorine; in the formula (II), $X^2$ is bromine, $R^6$ is the group NHCOY (in which Y is methyl), $R^7$ is methoxy and each of $R^4$ and $R^5$ is allyl; and, in the formula (III)$^1$, $X^4$ is bromine, $R^8$ is the group NHCOY (in which Y is methyl) and each of $R^9$ and $R^{10}$ is ethyl.

A dye mixture containing each of dye components of the respective formulae (I)$^1$, (II) and (III)$^1$ preferably contains, by weight of the weight of the mixture of dyes of the formulae (I)$^1$, (II) and (III)$^1$, from 5–50% inclusive of the dye of the formula (I);
from 5–75% inclusive of the dye of the formula (II); and
from 5–75% inclusive of the dye of the formula (III);
and more preferably
from 5–25% inclusive of the dye of the formula (I);
from 15–50% inclusive of the dye of the formula (II); and
from 30–60% inclusive of the dye of the formula (III).

In an alternative the preferred range of dye mixtures embodying the invention, in the dye of the formula (I), $R^1$ is $C_{1-4}$ alkyl, more preferably methyl. Such dyes are referred to below as dyes (I)$^2$. A preferred such dye has the formula (2)

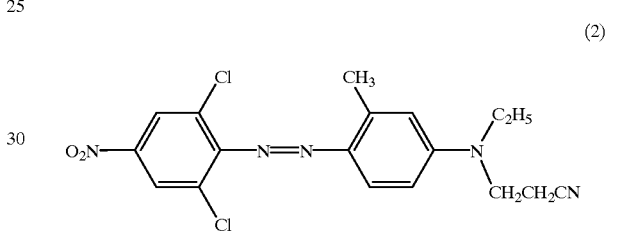

(2)

Such a dye provides especially high colour strength to dye mixtures embodying the invention, especially mixtures which are black in colour.

Especially when the mixture contains a dye (I)$^2$, a preferred dye of the formula (II) in the mixture has the formula

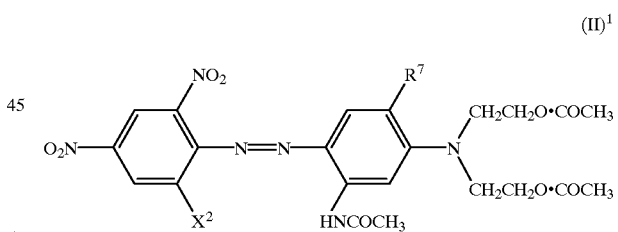

(II)$^1$ in which $X^2$ is chlorine or bromine and $R^7$ is methoxy or ethoxy.

It is not necessary to include, in a mixture containing the dyes of the formulae (I)$^2$ and (II)$^1$ a dye of the formula (III) but such dyes may be added when a different shade is required.

A dye mixture of dye components of the respective formulae (I)$^2$ and (II)$^1$ preferably contains from 15–75% inclusive of the dye of the formula (I)$^2$ and from 25–85% inclusive of the dye of the formula (II)$^1$, more preferably from 30–60% inclusive of the dye of the formula (I)$^2$, and from 40–70% inclusive of the dye of the formula (II)$^1$, by weight of the weight of the mixture of the dyes of formulae (I)$^2$ and (II)$^1$.

On the other hand, when, in a dye mixture containing dye components of the formula (I)$^2$ and (II)$^1$, a dye of the formula (III) is additionally present, this dye component preferably has the formula (III)²

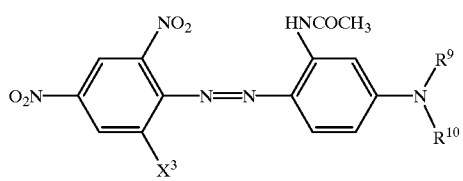

wherein $X^3$ is chlorine or bromine and each of $R^9$ and $R^{10}$ independently is ethyl or allyl.

In such a dye mixture, the dye of the formula (II) is preferably a dye (II)² in which $X^2$ is chlorine, each of $R^4$ and $R^5$ independently ethyl, allyl or acetoxyethyl, $R^6$ is the group NHCOY (in which Y is methyl or ethyl) and $R^7$ is $C_{1-6}$ alkoxy.

In an especially preferred dye mixture embodying the invention, in the formula (I)², each of X and $X^1$ is chlorine, $R^1$ is methyl, $R^2$ is ethyl and $R^3$ is cyanoethyl; in the formula (II)², $X^2$ is chloro, each of $R^4$ and $R^5$ is allyl, $R^6$ is the group NHCOY (in which Y is methyl) and $R^7$ is methoxy; and in the formula (III)², $X^3$ is chloro and each of $R^8$ and $R^9$ is ethyl.

A dye mixture containing each of dye components of the respective formula (I)², (II)² and (III)² preferably contains, by weight of the weight of the mixture of the dyes of the formulae (I)², (II)² and (III)², from 5–50% inclusive of the dye of the formula (I)²;
from 5–75% inclusive of the dye of the formula (II)²; and
from 5–75% inclusive of the dye of the formula (III)²;

and more preferably from 5–25% inclusive of the dye of the formula (I)²;
from 15–50% inclusive of the dye of the formula (II)²; and
from 30–60% inclusive of the dye of the formula (III)².

In yet another preferred range of dye mixtures embodying the invention, the dye of the formula (I) has the formula

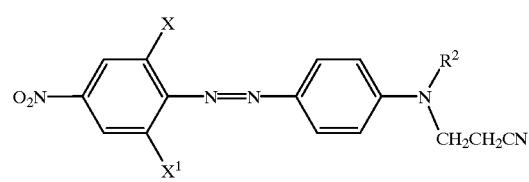

in which each of X and $X^1$ independently is chlorine or bromine and $R^2$ is n-butyl or cyanomethyl and the mixture additionally contains a dye of the formula (IV), given and defined above.

In such a dye mixture, an especially preferred dye of the formula (I)¹ has the formula

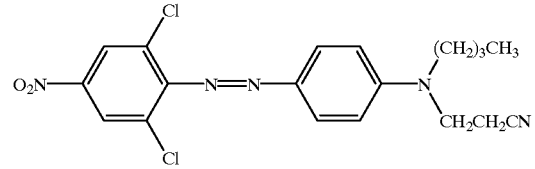

Such dye mixtures containing dye components of the formulae (I) and (IV) have particularly good build-up characteristics.

In an especially preferred dye mixture embodying the invention, in the formula (I)¹, each of X and $X^1$ is chlorine, $R^1$ is absent, $R^2$ is n-butyl, and $R^3$ is cyanoethyl; and, in the formula (IV), $R^{11}$ is hydrogen, $R^{12}$ is cyano, $R^{13}$ is acetoxy and each of m and n is 2.

A dye mixture containing each of dye components of the respective formulae (I)¹ and (IV) preferably contains from 10–90% inclusive of the dye of the formula (I)¹ and from 10–90% inclusive of the dye of the formula (IV), by weight of the weight of the mixture of dyes of the formulae (I)¹ and (IV) and more preferably from 25–75% inclusive of the dye of the formula (I)¹ and from 25–75% inclusive of the dye of the formula (IV).

All dyes of the formulae (I)–(IV) can be prepared in a conventional manner by diazotising and coupling.

Thus, dyes of the formula (I) may be prepared by diazotising an amine of the formula (V)

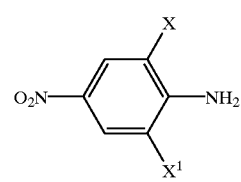

wherein each of X and $X^1$ independently is a chlorine or bromine atom, and coupling the diazotised amine to a coupling component of the formula (VI)

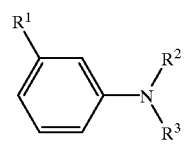

wherein each of $R^1$, $R^2$ and $R^3$ is as defined above.

Dyes of the formula (II) maybe prepared by diazotising an amine of the formula (VII)

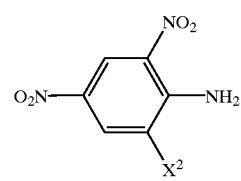

wherein $X^2$ is absent or is chlorine or bromine, and coupling the diazotised amine to a coupling component of the formula (VIII)

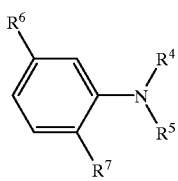

(VIII)

wherein each of $R^4$, $R^5$, $R^6$ and $R^7$ is as defined above.

Dyes of the formula (III) may be prepared by diazotising an amine of the formula (IX)

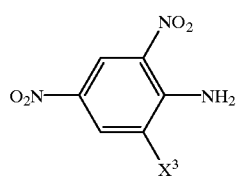

(IX)

wherein $X^3$ is absent or is chlorine or bromine, and coupling the diazotised amine to a coupling component of the formula (X)

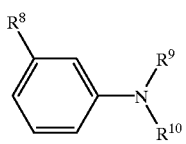

(X)

wherein each of $R^8$, $R^9$ and $R^{10}$ is as defined above.

Dyes of the formula (IV) may be prepared by diazotising an amine of the formula (XI)

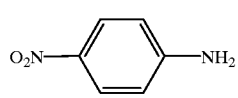

(XI)

and coupling the diazotised amine to a coupling component of the formula (XII)

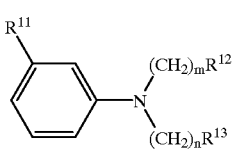

(XII)

wherein each of $R^{11}$, $R^{12}$, $R^{13}$, m and n is as defined above.

In the above diazotisation and coupling reactions, the diazotisation is carried out using a diazotising agent, which is preferably nitrosyl sulphuric acid, optionally diluted with glacial acetic acid or a phosphoric/acetic acid mixture and preferably at a temperature of 0–10° C., more preferably 0–5° C. and preferably at a pH<1 (say 0.5) up to 7, more preferably 0.5–1, followed by a subsequent increase in pH to 3–4 to isolate the dye.

A mixture embodying the invention of (1) at least one dye of the formula (I) (Component A), at least one dye of the formula (II) (Component B) and optionally at least one dye of the formula (III) or (2) at least one dye of formula (I) (Component A) and at least one dye of the formula (IV) (Component D) may additionally comprise at least one other dye (Component E), especially a yellow, greenish yellow, orange, red or brown dye capable of producing a navy or black shade. Preferably such other dyes are present in an amount by weight of up to (but no more than) 10%, more preferably 2–6%, of the total colour.

Especially in mixtures for providing a black colour using a mixture of dyes of the formula (I), (II) and (III), it is preferable to add a greenish yellow dye, which may be present in an amount of up to 10%, more preferably 2–6%, by weight of total dye colour and which, typically, may be 5-(2'-nitro)phenylazo-6-hydroxy-4-methyl-3-cyano-N-ethyl pyrid-2-one or 5-(2',3'-dichloro)phenylazo-6-hydroxy-4-methyl-3-cyano-N-methylpyrid-2-one.

Mixtures embodying the invention can be prepared, for example, by mixing the dye components in the required amounts. Suitable mixing methods include (1) Co-crystallisation Typically, the dyes are dissolved in a hot solvent, for example, by placing the dyes in a suitable solvent and heating up to the reflux temperature of the solvent until the dyes are dissolved, thereafter filtering to provide a solution, and then allowing the solution to cool and crystals to form. The resultant mixture may then undergo further processing, such as milling and spray drying. Examples of suitable solvents for this process are organic solvents such as aromatic hydrocarbons, chlorinated hydrocarbons, aliphatic hydrocarbons, alicyclic hydrocarbons, alcohols, amides, sulphoxides, esters, ketones and ethers. Specific examples of organic solvents are toluene, ethyl cellosolve, acetone, chlorobenzene, pyridine, dimethyl formamide, dimethylsulphoxide, ethyl acetate, benzene, tetrahydrofuran and cyclohexane.

Co-crystallisation is generally unsuitable for mixtures containing more than two components.

(2) Co-milling (a) The dyes are mixed and then milled together to give an intimate blend which is then spray dried to give a solid mixture; or (b) each dye is milled separately and then mixed in the required ratio before spray drying.

(3) Dry Blending

Each dye is spray dried separately and then mixed in the required ratio by a dry blending process.

Mixtures embodying the invention provide especially useful disperse dyes valuable for colouring synthetic textile materials and fibre blends thereof by exhaust dyeing, padding or printing, and may be formed into dispersions for this purpose. They may also be used in, for example, ink jet printing of textiles and non-textiles, dye diffusion, thermal transfer printing and in the colouration of plastics.

A particular aspect of the invention provides a composition comprising a mixture of (1) dyes (I), (II) and optionally (III) or (2) dyes (I) and (IV), and optionally at least one other disperse dye and, additionally, optionally at least one further ingredient conventionally used in colouring applications such as a dispersing agent, surfactant or wetting agent. The composition typically comprises from 1% to 65%, preferably 10 to 60%, more preferably 20 to 55%, of the total dye mixture in a liquid, preferably an aqueous, or solid medium. Liquid compositions are preferably adjusted to pH 2 to 7, more preferably pH 4 to 6.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-foamers such as mineral oil or nonanol, organic liquids and buffers. Dispersing agents may be present at from 10% to 200% on the weight of the dye mixtures. Wetting agents may be used at from 0% to 20% on the weight of the dye mixtures.

The compositions may be prepared by bead milling the dye mixture with glass beads or sand in an aqueous medium. The compositions may have further additions of dispersing agents, fillers and other surfactants and may be dried, by a technique such as spray drying, to give a solid composition comprising from 5% to 65% of dyestuff.

According to another aspect, the invention provides a process for colouring a synthetic textile material or fibre blend thereof which comprises applying to the synthetic textile material or fibre blend a mixture comprising (1) at least one dye of the formula (I), at least one dye of the formula (II) and optionally at least one dye of the formula (III) or (2) at least one dye of the formula (I) and at least one dye of the formula (IV).

The synthetic textile material may be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibres of any of the above mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

The mixtures of dyes of formulae (I), (II) and (III) or (I) and (IV), optionally in conjunction with other disperse dyes may be applied to the synthetic textile materials or fibre blends by processes which are conventionally employed in applying disperse dyes to such materials and fibre blends.

Suitable process conditions may be selected from the following (i) exhaust dyeing at a pH of from 4 to 6.5, at a temperature of from 125° C. to 140° C. for from 10 to 120 minutes and under a pressure of from 1 to 2 bar, a sequestrant optionally being added;

(ii) continuous dyeing at a pH of from 4 to 6.5, at a temperature of from 190° C. to 225° C. for from 15 seconds to 5 minutes, a migration inhibitor optionally being added;

(iii) direct printing at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;

(iv) discharge printing (by padding the dye on to the textile material, drying and overprinting) at a pH of from 4 to 6.5, migration inhibitors and thickeners optionally being added;

(v) carrier dyeing at a pH of from 4 to 6.5, at a temperature of from 95° C. to 100° C. using a carrier such as methylnaphthalene, diphenylamine or 2-phenylphenol, sequestrants optionally being added; and (vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants optionally being added.

In all the above processes, the dye mixture is applied as a dispersion comprising from 0.001% to 6, preferably from 0.005 to 4%, of the dye mixture in an aqueous medium.

In addition to the above-mentioned application processes, the dye mixtures may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_{1-4}$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dye mixtures may also be applied to textile materials using supercritical carbon dioxide, in which case the dye formulating agents may optionally be omitted.

Embodiments of the present invention will now be described in more detail with reference to the following Examples, in which parts are by weight unless otherwise stated.

EXAMPLES 1–8

Preparation of Dyes

Example 1

2,6-dichloro-4-nitroaniline (0.01 m) was dissolved in a mixture of 43 parts acetic acid and 7 parts propionic acid, cooled to 0° C. and diazotised by adding 3.0 ml of a 40% solution of nitrosyl sulphuric acid in sulphuric acid. The diazo solution was added to a solution of N-butyl-N-(2'-cyanoethyl) aniline (0.01 m) in ice/water containing 50 ml of acetic acid and 5.0 g of sulphamic acid. The coupling reaction mixture was stirred for 1 hour at 0–5° C. then allowed to come to room temperature overnight. The product was filtered off, washed with water and dried at 50° C. The dry solid was extracted into 75 ml hot ethyl acetate then allowed to crystallise. The filtered solid was washed with ethyl acetate and hexane the dried to yield 2.12 g of a dye Component (1) within the formula (I):

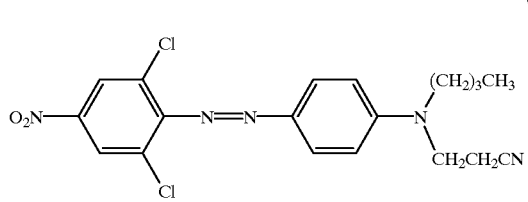

(I)

Example 2

2,6-dichloro-4-nitroaniline (0.01 m) was dissolved in a mixture of 43 parts acetic acid and 7 parts propionic acid, cooled to 0° C. and diazotised by adding 3.0 ml of a 40% solution of nitrosyl sulphuric acid in sulphuric acid. The diazo solution was added to a solution of N-ethyl-N(2'-cyanoethyl)-3-toluidine (0.01 m) in ice/water containing 50 ml of acetic acid and 5.0 g of sulphamic acid. The coupling reaction mixture was stirred for 1 hour at 0–5° C. then allowed to come to room temperature overnight. The product was filtered off, washed with water and dried at 50° C. The dry solid was extracted into 100 ml hot ethyl acetate then cooled and diluted with hexane (400 ml) and allowed to crystallise. The filtered solid was washed with hexane then dried to yield 2.55 g of a dye Component (2) within the formula (I):

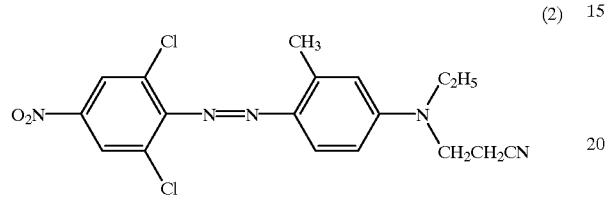

(2)

Example 3

2,4-dinitro-6-chloroaniline (0.12 m) was powdered in a mortar and added over 30 minutes to a mixture of nitrosyl sulphuric acid (0.12 m) in sulphuric acid (0.7 m) while maintaining the temperature at 20–25° C. by external cooling. The reaction mixture was stirred for a further 1 hour to complete the diazotisation. 3-N,N-diethyl-4-methoxyacetanilide (0.1 m) was dissolved in ice/water (2000 ml) containing sulphuric acid (0.10 m) and sulphamic acid (5.0 g). Sodium acetate (200 ml of 40% solution) was added to adjust the pH of the suspension to 4.5–5 and the diazo solution was added slowly at 0–5° C. The pH of the coupling was maintained at 4–4.5 by the addition of 28% sodium hydroxide solution and the temperature maintained by the addition of ice. The coupling reaction mixture was stirred for 2 hours at 0–5° C. then the product was filtered off and washed first with water then aqueous acetone. The resultant press cake was dried at 50° C. to give 42.87 of dry solid. The dye was extracted into 500 ml of hot ethyl acetate, then allowed to crystallise overnight. The filtered solid was washed first with ethyl acetate then hexane to give 34.45 of a pure blue dye Component (3) within the formula (II):

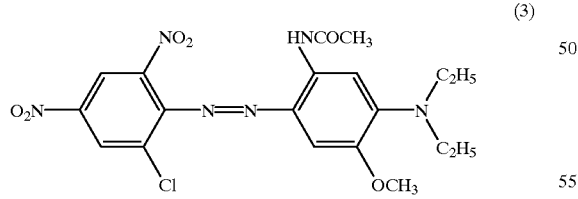

(3)

Example 4

2,4-dinitro-6-chloroaniline (0.10 m) was dissolved in a mixture of 215 parts acetic acid and 35 parts propionic acid, cooled to 0° C. and diazotised by adding 22 ml of a 40% solution of nitrosyl sulphuric acid in sulphuric acid. The diazotisation reaction mixture was stirred for 1 hour at 5–10° C. The resulting diazo solution was added slowly to a mixture of 3-N,N-diethyl-acetanilide (0.1 m) dissolved in ice/water (3000 ml) containing 50 ml acetic acid, 5.0 g sulphamic acid and 80 g of sodium acetate. The coupling reaction mixture was stirred for 1 hour at 0–5° C., then allowed to come to room temperature overnight. The product was filtered off and washed well with 50% aqueous acetone. The press cake was dried at 50° C. to give 35.68 of dry solid. The dye was extracted into 500 ml of hot ethyl acetate, then allowed to crystallise overnight. The filtered solid was washed first with ethyl acetate then hexane to give 21.6 g of a violet dye Component (4) within the formula (III):

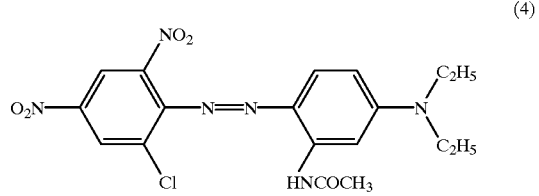

(4)

Example 5

2,4-dinitro-6-bromoaniline (0.12 m) was powdered in a mortar and added over 30 minutes to a mixture of nitrosyl sulphuric acid (0.12 m) in sulphuric acid (0.7 m) while maintaining the temperature at 20–25° C. by external cooling. The reaction mixture was stirred at this temperature for a further 1 hour to complete the diazotisation. 3-N,N-diethyl 4-methoxyacetanilide (0.1 m) was dissolved in ice/water (2000 ml) containing sulphuric acid (0.1 m) and sulphamic acid (5.0 g). Sodium acetate (100 ml of 40% solution) was added to adjust the pH of the suspension to 4.5–5 and the diazo solution was added slowly at 0–5° C. The pH of the coupling reaction mixture was maintained at 4–4.5 by the addition of 28% sodium hydroxide solution and the temperature maintained by the addition of ice. The coupling reaction mixture was stirred for 2 hours then the product filtered off, and washed well with dilute acetic acid then dilute hydrochloric acid. The press cake was dried at 50° C. to give 52.2 of dry solid. The dye was extracted into 750 ml of hot ethyl acetate then allowed to crystallise overnight. The filtered solid was washed first with ethyl acetate then hexane to give 33.06 g of a pure blue dye Component (5) within the formula (II):

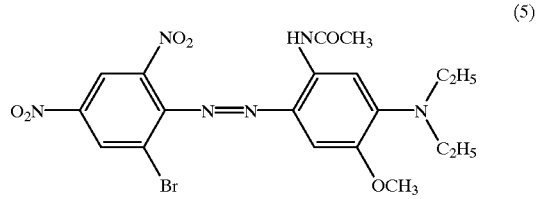

(5)

Example 6

2,4-dinitro-6-bromoaniline (0.12 m) was powdered in a mortar and added over 30 minutes to a mixture of nitrosyl sulphuric acid (0.12 m) in sulphuric acid (0.7 m) while maintaining the temperature at 20–25° C. by external cooling. The reaction mixture was stirred for a further 1 hour to complete the diazotisation. The diazo solution was added slowly to a mixture of 3-N,N-diethylacetanilide (0.1 m) dissolved in ice/water (2000 ml) containing sulphuric acid (0.1 m) and sulphamic acid (5.0 g). Sodium acetate (26 ml of 40% solution) was added to adjust the pH of the suspension to 4–4.5 and addition of the diazonium solution begun. The pH of the coupling reaction mixture was maintained at 4–4.5 by the addition of 28% sodium hydroxide solution and the temperature maintained at 0–5° C. by the addition of ice. The coupling reaction mixture was stirred for 1 hour then the product filtered off, and washed well with water. The resultant press cake was dried at 50° C. to give 46.9 g of dry solid. The dye was extracted into 500 ml of hot ethyl acetate then allowed to crystallise overnight. The filtered solid was washed first with ethyl acetate then hexane to give 31 g of a violet dye Component (6) within the formula (III):

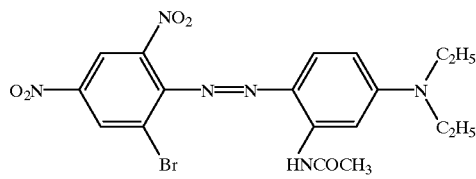

(6)

Example 7

2,4-dinitro-6-bromoaniline (0.1 m) was dissolved in a mixture of 215 parts acetic acid and 35 parts propionic acid, cooled to 0° C. and diazotised by adding 20 ml of a 40% solution of nitrosyl sulphuric acid in sulphuric acid. The diazotisation reaction mixture was stirred for 1 hour at 5–10° C. 3-N,N-diallyl-4-methoxyacetanilide (0.1 m) was dissolved in ice/water (2000 ml) containing acetic acid (50 ml), sulphamic acid (5.0 g) and sodium acetate (40 g). At the end of the addition the pH of the coupling reaction mixture was adjusted to 4.0 by adding 100 ml of a 40% w/v solution of sodium acetate in water. The coupling reaction mixture was stirred for 2 hours at 0–5° C. then the product was filtered off, washed with 50% aqueous acetone and dried. The dry product was extracted into 750 ml hot ethyl acetate, then allowed to cool overnight. The resulting product was filtered off, washed with ethyl acetate then hexane and dried to yield 36.47 g of a pure blue dye Component (7) within the formula (II):

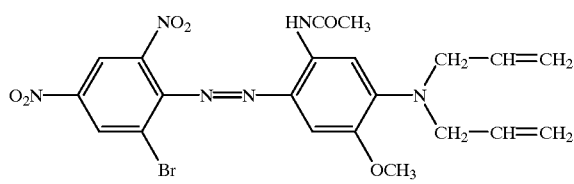

(7)

Example 8

2,4-dinitro-6-chloroaniline (0.10 m) was dissolved in a mixture of 215 parts acetic acid and 35 parts propionic acid, cooled to 0° C. and diazotised by adding 22 ml of a 40% solution of nitrosyl sulphuric acid in sulphuric acid. The diazotisation reaction mixture was stirred for 1 hour at 5–10° C. 3-N,N-diallyl-4-methoxyacetanilide (0.1 m) was dissolved in ice/water (3000 ml) containing acetic acid (50 ml), sulphamic acid (5.0 g) and sodium acetate (80 g). The coupling reaction mixture was stirred for 2 hours at 0–5° C., then the product was filtered off, washed with 50% aqueous acetone and dried. The dry product was extracted into 500 ml hot ethyl acetate, then allowed to cool overnight. The recrystallised product was filtered off, washed with ethyl acetate, then hexane and dried to yield 32.4 g of a pure blue dye Component (8) within the formula (II):

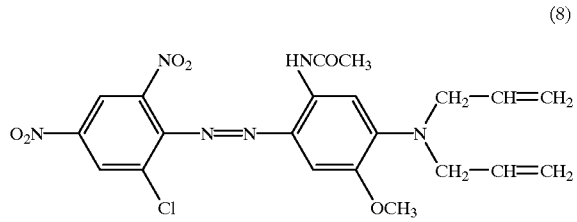

(8)

EXAMPLES 9–11

Preparation and Application of the Mixtures

Example 9

The yellow brown component (1) of formula (I), the blue dye Component (7) of formula (II) ($X^2$=Br, $R^4$ & $R^5$=$CH_2CH$=$CH_2$, Y=$CH_3$, $R^7$=$OCH_3$) and the violet dye Component (6) of formula (III) ($X^3$=Br, $R^9$ & $R^{10}$=$C_2H_5$, Y=$CH_3$) were prepared separately as aqueous dispersions by milling each as a 40% aqueous slurry with 20 parts of a high temperature stable dispersing agent until the dye particle size (mean diameter) was in the range 0.1–5 microns.

38.1 parts of dye Component (1), 7.9 parts of the blue dye Component (7) and 37.5 parts of the violet dye Component (6) were mixed together and shaded with 5 parts of a greenish yellow disperse dye, namely 5-(2'-nitro)phenylazo-6-hydroxy-4-methyl-3-cyano-N-ethyl pyrid-2-one, to achieve a black shade on polyester. 45 parts of this mixture were then standardised to a liquid brand containing 18% of colour, by the addition of 6.5 parts of a humectant and water (to 100 parts). This liquid is especially suitable for use in the exhaust dyeing and continuous dyeing of polyester and polyester/cellulose blends and can also be used for direct printing.

The same dispersion was standardised to a solid brand containing 55% of the mixture and 45% dispersing agent, by the addition of a temperature stable dispersing agent and drying to either a grain or powder form in a spray dryer. This product is especially suitable for the exhaust dyeing of polyester, polyester/cellulose and polyester/wool blends and can also be used for continuous dyeing and direct printing.

A dyebath for the exhaust dyeing of polyester in piece form was prepared by adding 10 mls of an aqueous dispersion of the solid brand (1 g dye in 100 mls water at 40–50° C.) to 48.8 mls of de-ionised water and 1.2 mls of buffer solution. To this dyebath was added a 5 g piece of polyester and the whole was held for 30 minutes at 130° C. in a Werner Mathis Labomat high temperature dyeing machine. After rinsing with water and a reduction clearing treatment, the material was dyed to an ISO light black shade.

Example 10

The yellow brown Component (2) of formula (I), the blue dye Component (8) of formula (II) ($X^2$=Cl, $R^4$ & $R^5$=$CH_2CH$=$CH_2$, Y=$CH_3$, $R^7$=$OCH_3$) and the violet dye Component (4) of formula (III) ($X^3$=Cl, $R^9$ & $R^{10}$=$C_2H_5$, Y=$CH_3$) were prepared separately as aqueous dispersions by milling each as a 40% aqueous slurry with 20 parts of a high temperature stable dispersing agent until the dye particle size (mean diameter) was in the range 0.1–5 microns.

32.2 parts of dye Component (1), 19.4 parts of the blue dye Component (8) and 31.3 parts of the violet dye Component (4) were mixed together and shaded with the greenish yellow disperse dye used in Example 9 to achieve a black shade on polyester.

This dispersion was standardised to a solid- brand containing 55% of the mixture and 45% dispersing agent, by the addition of a temperature stable dispersing agent and drying to either a grain or powder form in a spray dryer. This product is especially suitable for the exhaust dyeing of polyester, polyester/cellulose and polyester/wool blends and can also be used for continuous dyeing and direct printing.

A dyebath for the exhaust dyeing of polyester in piece form was prepared by adding 10 mls of an aqueous dispersion of the solid brand (1 g dye in 100 mls water at 40–50° C.) to 48.8 mls of de-ionised water and 1.2 mls of buffer solution. To this dyebath was added a 5 g piece of polyester and the whole was held for 30 minutes at 130° C. in a Werner Mathis Labomat high temperature dyeing machine. After rinsing with water and a reduction clearing treatment, the material was dyed to an ISO light black shade.

Example 11

33.1 parts of the yellow brown dye Component (1) of formula (I) and 16.1 parts of a yellow brown/orange dye Component (9) of formula (IV) $R^{11}$=H, $R^{12}$=CN and $R^{13}$=O.$COCH_3$) were mixed together and an aqueous dispersion prepared by milling as a 40% aqueous slurry with 25 parts of a high temperature stable dispersing agent until the dye particle size (mean diameter) was in the range 0.1–5 microns.

This dispersion was standardised to a solid brand containing 50% of the mixture and 50% dispersing agent, by the addition of a temperature stable dispersing agent and drying to either a grain or powder form in a spray dryer. This product is especially suitable for the exhaust dyeing of polyester, polyester/cellulose and polyester/wool blends and can also be used for continuous dyeing and direct printing.

A dyebath for the exhaust dyeing of polyester in piece form was prepared by adding 3.75 mls of an aqueous dispersion of the solid brand (1 g dye in 100 mls water at 40–50° C.) to 56.25 mls of de-ionised water and 1.2 mls of buffer solution. To this dyebath was added a 5 g piece of polyester and the whole was held for 30 minutes at 130° C. in a Werner Mathis Labomat high temperature dyeing machine. After rinsing with water and a reduction clearing treatment, the material was dyed to a yellow brown shade.

What is claimed is:

1. Dye mixture comprising at least
(1)
(A) at least one azo dye of the formula (I)

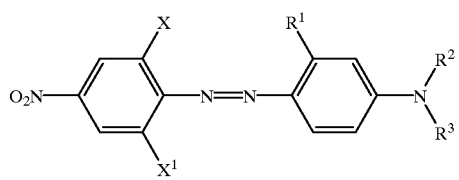

(I)

wherein
each of X and $X^1$ independently is chlorine or bromine;
$R^1$ is absent; and
$R^2$ is n-butyl or cyanoethyl and $R^3$ is cyanoethyl; and (B) at least one azo dye of the formula (II)

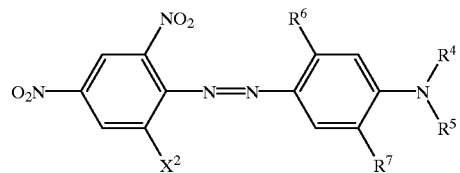

(II)

wherein
$X^2$ is absent or is chlorine or bromine;
each of $R^4$ and $R^5$ independently is hydrogen, $C_{1-4}$ alkyl, allyl or acyloxyalkyl $R^6$ is $C_{1-4}$ alkyl or NHCOY, in which Y is hydrogen, $C_{1-4}$ alkyl, or $NH_2$ and $R^7$ is $C_{1-4}$ alkoxy; and
at least when in the formula (II), $X^2$ is bromine, $R^6$ is NHCOY (in which Y is methyl), $R^7$ is methoxy and each of $R^4$ and $R^5$ is allyl or one of $R^4$ and $R^5$ is allyl and the other is hydrogen (C) at least one azo dye of the formula (III)

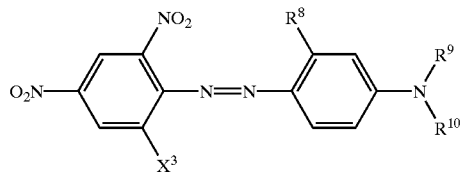

(III)

wherein
$X^3$ is absent or is chlorine or bromine;
$R^8$ is $C_{1-4}$ alkyl or NHCOY, in which Y is hydrogen, $C_{1-4}$ alkyl or $NH_2$; find each of $R^9$ and $R^{10}$ independently is hydrogen, $C_{1-4}$ alkyl; allyl or acyloxyalkyl or (2)
(A) at least one azo dye of the formula (I); given and defined above, and
(D) at least one azo dye of the formula (IV)

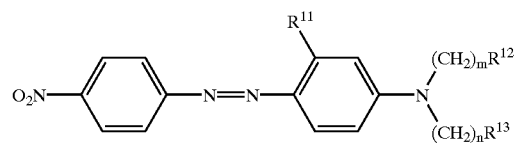

(IV)

wherein
$R^{11}$ is absent or is $C_{1-4}$ alkyl;
$R^{12}$ is hydrogen, cyano, hydroxyl, $OCOR^{14}$ or $OCOOR^{14}$ in which $R^{14}$ is $C_{1-4}$ alkyl, aryl or aralkyl;
$R^{13}$ is hydroxyl, $OCOR^{14}$ in which $R^{14}$ is as defined above; and
each of m and n independently is 1, 2, 3 or 4.

2. Dye mixture according to claim 1 comprising a dye of the formula $(I)^1$

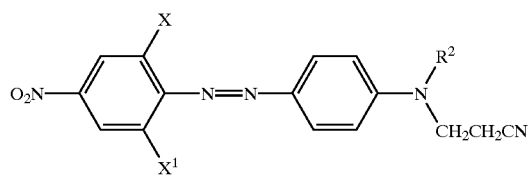

in which each of X and $X^1$ independently is chlorine or bromine and $R^2$ is n-butyl or cyanoethyl;
and a dye of the formula $(II)^1$

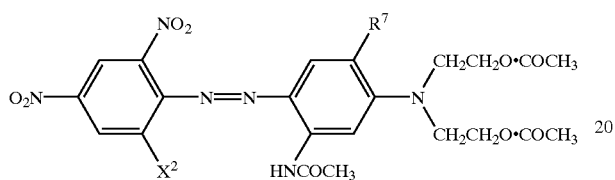

in which $X^2$ is chlorine or bromine and $R^7$ is methoxy or ethoxy.

3. Dye mixture according to claim 1 comprising a dye of the formula $(I)^1$

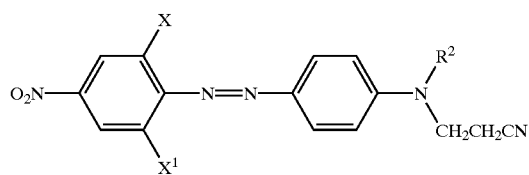

wherein
each of X and $X^1$ is chlorine, $R^2$ is n-butyl and a dye of the formula (IV)

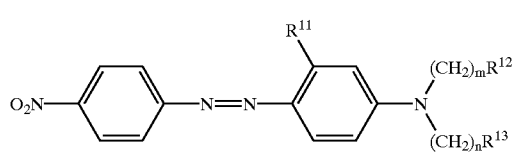

wherein
$R^{11}$ is hydrogen, $R^{12}$ is cyano, $R^{13}$ is acetoxy and each of m and n is 2.

4. Dye mixture according to claim 2, wherein the dye of formula (III) is a dye of the formula $(III)^1$

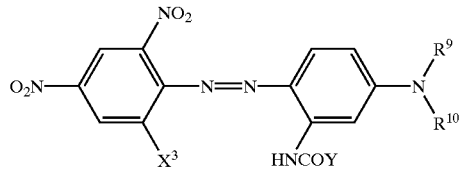

in which $X^3$ is chlorine or bromine, Y is methyl or ethyl and each of $R^9$ and $R^{10}$ independently is ethyl or allyl.

5. Dye mixture according to claim 1, which further comprises 5-(2'-nitro)phenylazo-6-hydroxy-4-methyl-3-cyano-N-ethyl pyrid-2-one or 5-(2',3'-dichloro)phenylazo-6-hydroxy-4-methyl-3-cyano-N-methylpyrid-2-one as further dye components.

6. A process for the preparation of a dye mixture according to claim 1, comprising mixing the dye components.

7. A composition comprising a dye mixture according to claim 1, and at least one dispersing agent, surfactant or wetting agent.

8. A process for coloring a synthetic textile material or fibre blend thereof, which comprises applying thereto the dye mixture according to claim 1.

9. The dye mixture according to claim 2, wherein X and $X^1$ are chlorine and $R^2$ is n-butyl.

10. Dye mixture comprising a dye of the formula (I)

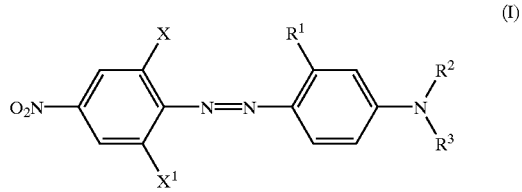

wherein each of X and $X^1$ independently is chlorine or bromine;

$R^1$ is $C_{1-4}$ alkyl; and each of $R^2$ and $R^3$ independently is hydrogen, $C_{1-6}$ alkyl or cyanoethyl; and a dye of the formula $(II)^1$

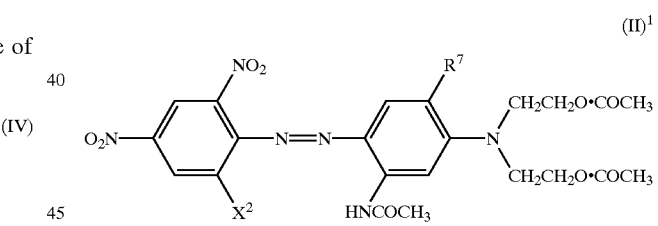

in which $X^2$ is chlorine or bromine and $R^7$ is methoxy or ethoxy.

11. Dye mixture according to claim 10, wherein the dye of formula (III) is a dye of the formula $(III)^2$

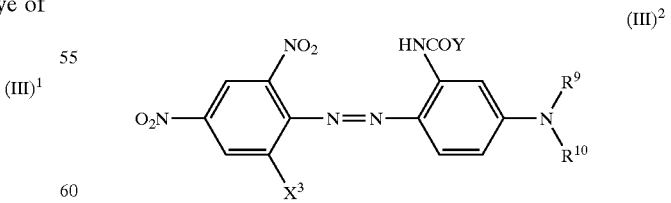

wherein $X^3$ is chlorine or bromine and each of $R^9$ and $R^{10}$ independently is ethyl or allyl.

* * * * *